United States Patent Office.

R. O. LOWREY, OF SALEM, NEW YORK.

Letters Patent No. 93,102, dated July 27, 1869.

---

IMPROVED COMPOUND FOR RENDERING FABRICS WATER-REPELLENT.

--- the Schedule referred to in these Letters Patent and making part of the same.

---

*To all whom it may concern:*

Be it known that I, R. O. LOWREY, of Salem, in the county of Washington, and State of New York, have invented certain new and useful Improvements in the Production and Application of Water-Repellent Compounds; and I do hereby declare that the following is a full, clear, and exact description thereof.

To enable others skilled in the art to construct and use my invention, I will proceed to describe it.

My invention relates to the production and application of water-repellent solutions; and consists in the combination of an artificial gum, made as described in my patent for water-repellent fluid, No. 89,055, dated April 20, 1869, or as hereinafter more particularly described, with a solution of paraffine, or stearine, or spermaceti, or a solution of any two, or all three of them combined, and in applying this combination to fibrous or porous substances, whether in a raw, felted, or textile state, or when manufactured into various articles, for the purpose of rendering them water-repellent.

I first prepare a water-repellent solution or fluid, as described in my patent of April 20, 1869, above referred to.

This solution consists of an artificial gum, in combination with volatile liquids.

While the manner of making the artificial gum is set forth in my above-mentioned patent, yet, as various compositions of soap may be used in its manufacture, I will describe the manner of producing the gums preferred for my present purpose.

I make a soap, by taking, of resin, two (2) parts, and of tallow, or other grease, one (1) part, and dissolving them in caustic alkali.

It should be made as neutral as possible, without any excess of either grease or alkali.

This soap I dissolve in water, then boil the solution, and, while boiling, add a quantity, equal by weight to about one-half of the weight of the soap, of the sulphate of zinc, two (2) parts, and of salt, one (1) part.

The gum is then formed, when I remove the water from it, and drive off all moisture that may be remaining by the application of heat.

It is then in a melted state, and may be combined with the solvent.

Another quality of artificial gum and fluid, suitable for my purpose, I make, by taking of the soap above described, three (3) parts, and of pure tallow-soap, two (2) parts, then dissolve and boil in water, and, while boiling, add a quantity, equal by weight to about one-half of the weight of the soap, of alum, two (2) parts, and salt, one (1) part.

The gum will then form as before, when I rinse it in clean water, then thoroughly dry it, and after it is dried, combine it with the solvent.

Having prepared my gum-solution, I then prepare my solution of paraffine, or stearine, or spermaceti, o any two, or of all three combined, by the use of naphtha, benzine, or other solvent.

Selecting the solvent to be used, I place it in some suitable vessel, preferably in one that can be closed air-tight, so as to prevent evaporation.

I then take the paraffine, or the stearine, or the spermaceti, whichever one of them I desire to use, and cut or reduce it, by any convenient means, to small pieces, and place these pieces into the vessel containing the solvent.

I then shake or agitate the whole thoroughly, and afterwards let it stand until the substance introduced is dissolved.

If desired, the operation may be hastened by the application of heat.

In like manner, any two or all three of the substances, paraffine, stearine and spermaceti, may be dissolved.

Or, if desired, any one, two, or all three, may be first melted and then poured into the solvent, or the reverse of this process be performed, the object being simply to produce a solution of any one, two, or all three of the same, as desired.

Having prepared my solution of paraffine, or stearine, or spermaceti, or of any two, or all three of the same, as described, I mix it with my artificial gum-solution.

The proportions of the solutions to each other may be varied, as the application of the combination or mixture will give similar results, differing only in their strength and quality.

It is obvious, that instead of making separate solutions and then combining them, that the artificial gum, and the paraffine, or stearine, or spermaceti, may be melted together, and then combined with the benzine or other solvent.

And it is further obvious, that instead of the artificial gum any natural gum may be used with the paraffine, or stearine, or spermaceti, that can be dissolved with the same solvent.

The mixture thus produced, will be found to possess strong water-repellent qualities, which it will impart to other substances when treated with it.

The fibrous or porous substances to be made water repellent, whether in a raw, felted, or textile state, or whether manufactured into articles of any kind, I saturate with this compound.

This may be done by dipping them into the compound, or by applying the compound with a sponge or brush.

If the application is made by dipping, immersing, or soaking, the surplus of the solution can be removed by pressing or wringing.

The materials or articles thus treated, are then dried in the ordinary manner, in the open air, or by artificial heat, as desired, and when dried, they will be found to be water-repellent.

Having thus described my invention,

What I claim, is—

1. A repellent fluid or composition made of the ingredients, and in the manner substantially as herein described, and for the purpose set forth.

2. The treatment of fibrous and porous substances, whether in a raw, felted, or textile state, as well as of articles made therefrom, by the application of the repellent fluid herein described, substantially as and for the purpose set forth.

3. The repellent-materials or articles, when so made, by the application of my repellent-fluid or composition, as herein described.

R. O. LOWREY.

Witnesses:
H. B. MUNN,
P. T. DODGE.